(12) United States Patent
Lakic

(10) Patent No.: US 7,849,690 B1
(45) Date of Patent: Dec. 14, 2010

(54) SELF CONTAINED IN-GROUND GEOTHERMAL GENERATOR

(76) Inventor: Nikola Lakic, 45-191 Elm St., Indio, CA (US) 92201

( * ) Notice: Subject to any disclaimer, the term of this patent is extended or adjusted under 35 U.S.C. 154(b) by 818 days.

(21) Appl. No.: 11/770,543

(22) Filed: Jun. 28, 2007

Related U.S. Application Data

(60) Provisional application No. 60/922,440, filed on Apr. 7, 2007, provisional application No. 60/927,336, filed on May 2, 2007.

(51) Int. Cl.
*F03G 7/00* (2006.01)
(52) U.S. Cl. .................. 60/641.2; 290/1 A; 290/2
(58) Field of Classification Search ..... 60/641.2–641.4; 290/1 A, 2
See application file for complete search history.

(56) References Cited

U.S. PATENT DOCUMENTS 3,939,356 A * 2/1976 Loane ..................... 290/52
3,986,362 A * 10/1976 Baciu ....................... 60/641.2
4,407,126 A * 10/1983 Aplenc ..................... 60/641.4
5,058,386 A * 10/1991 Senanayake ................. 60/692
6,259,165 B1 * 7/2001 Brewington ................. 290/1 A

* cited by examiner

*Primary Examiner*—Hoang M Nguyen
(74) *Attorney, Agent, or Firm*—Schmeiser, Olsen & Watts LLP

(57) ABSTRACT

A method of using geothermal energy to produce electricity by lowering a geothermal generator deep into pre-drilled holes below the Earth's surface. A geothermal generator includes a boiler, a turbine compartment, an electric generator, a condenser and an electric cable. The geothermal generator also includes an internal cylinder, an external cylinder and a plurality of tubes disposed between the internal cylinder and the external cylinder. The plurality of tubes is part of the condenser. In a method of using the geothermal generator, water contained within the boiler is converted to high-pressure, super heated steam due to heat contained within a pre-drilled well below the earth's surface. The steam is used to produce electric energy, which is transported to the ground surface by the electric cable.

22 Claims, 14 Drawing Sheets

SELF CONTAINED IN-GROUND GEOTHERMAL GENERATOR

CROSS REFERENCE TO RELATED APPLICATIONS

This application claims priority to U.S. Provisional Patent Application to Nikola Lokic entitled "SELF CONTAINED IN GROUND GEO-THERMAL GENERATOR," Ser. No. 60/922,440, filed Apr. 7, 2007, and to U.S. Provisional Patent Application to Nikola Lakic entitled "SELF CONTAINED IN GROUND GEO-THERMAL GENERATOR," Ser. No. 60/927,336, filed May 2, 2007, the disclosures of which are hereby incorporated entirely herein by reference.

BACKGROUND OF THE INVENTION

1. Technical Field

This invention relates generally to a self-contained in-ground geothermal generator. This invention also relates to the effective use of geothermal energy.

2. State of the Art

Geothermal is a renewable energy source made possible by the same tectonic activity that causes local earthquakes and the rising of the Rocky Mountains. The earth's rigged outer shell, the lithosphere, rests upon the hotter and more plastic region of the upper mantle, below the crust, called the asthenosphere. The thickness of the earth's crust varies from a few miles to perhaps one hundred and fifty miles. Rock heated by magma deep below the surface boils water trapped in underground reservoirs—sometimes as hot as 700 degree F. Some of this hot geothermal water travels back up through faults and cracks and reaches the earth's surface as hot springs or geysers, but most of it stays deep underground, trapped in cracks and porous rock. This natural collection of hot water is called a geothermal reservoir. We already enjoy some of this activity via natural hot springs.

Presently, wells are drilled into the geothermal reservoirs to bring the hot water to the surface. At geothermal power plants, this hot water is piped to the surface. Then, after removing silica, steam is created and used to spin turbines to produce electricity. It's also a proven, relatively clean energy source. More than 30 nations sitting in earthquake and volcanic zones have extensively used geothermal power for decades.

Existing use of geothermal energy is limited with location. Geothermal resources are limited to the "shallow" hydrothermal reservoirs at the crustal plate boundaries. Much of the world is underlain (3-6 miles down), by hot dry rock—no water, but lots of heat.

The invention of the coal-burning steam engine revolutionized industrial production in the 18$^{th}$ c. and opened the way to the development of mechanized transport by rail and sea. The modern steam engine, using high-pressure superheated steam, remains a major source of electrical power and means of marine propulsion, though oil has replaced coil as the fuel in many installations and the reciprocating engine has given way to the steam turbines.

Modern wells, mostly used in the oil industry and geothermal plants, drilled using rotary drills, can achieve lengths of over 38,000 feet (12 000 meters). The well is created by drilling a hole 5 to 30 inches (13-76 cm) in diameter into the earth. Drilling technology is improving every day. The combination of drilling technology and tunneling technology can produce even better results and wider and deeper wells.

Accordingly, there is a need in the field of geothermal energy for an apparatus and method for effectively using the enormous heat resources of the earth's crust that are accessible by using current drilling technology.

DISCLOSURE OF THE INVENTION

The present invention relates to a self contained, in-ground geothermal generator, which continuously produces relatively cheap electric energy from renewable geothermal resources. The generator is not limited to use in the "shallow" hydrothermal reservoirs discussed above.

By lowering the unit with a cable into a pre-drilled well to the desired level and temperature, geothermal energy becomes controllable and production of electric energy becomes available. Electricity is produced by the generator at the in-ground unit and is then transported to the surface by an electric cable.

Relatively cheap and clean electric energy continuously produced from geothermal renewable source, besides common use in homes and businesses, can be used for production of hydrogen which can be used as a clean source of energy in many applications including the auto industry and can eventually replace depleting, expensive and polluting oil, coal and other fossil fuels, which are used to create electricity. Nuclear power plants with very toxic waste material can also be replaced.

The self contained in-ground geothermal generator comprises a slim cylindrical shape, which, positioned vertically, can be lowered with a system of cables deep into the ground in a pre-drilled well. This generator includes a boiler with water, turbines, a gear box, an electric generator and a condenser with a system of insulated tubes for returning water back into the boiler.

There are many areas in many countries with earthquake and volcanic zones where hot rocks can be reached in a relatively short distance from the surface.

The self contained geothermal generator is lowered deep in the ground to the hot rocks. The bottom part of the boiler has several vertical indents (grooves) to increase its conductive surface, thereby increasing the conductivity of heat from the hot rocks to the water inside the boiler, which produces high-pressure superheated steam, which then turns the turbines.

The axle of the turbine is a solid shaft and is connected to the axis of the rotor of the electric generator, which is a cylindrical shaft that rotates within generator and produces electricity. The cylindrical shape of the rotor shaft allows for steam to pass through to the condenser. The cylindrical shaft of the rotor also functions as a secondary turbine. It has a secondary set of small blades attached to the inside wall and positioned to increase the rotation of the rotor. Exhausted steam then reaches the condenser through a system of insulated tubes where the steam condenses and returns to the boiler as water. This process is repetitive and is regulated with two sets of check valves which can be activated automatically by pressure or heat or electronically by sensors and a computer in a control room on the surface.

The purpose of the gear box, or converter, which is located between the turbines and the generator, is to neutralize momentum produced by the spinning turbines by changing the direction of the rotor of the generator. Thus, the rotor of the generator spins in the opposite direction than the main turbines.

The boiler of the assembly can be also filled with liquid, such as isopentane, that boils at a lower temperature than water to make the unit functional at less depth or a lower temperature.

The coolant for the condenser can be filled with liquid hydrogen, nitrogen or other liquid with a higher boiling point than water. The condenser can also be cooled with cold water with an additional independent system of tubes, such as a closed loop system of tubes, which extend sufficiently, if needed, toward the surface to exchange heat. Also, if needed, the flow of cold water can be forced through the same cooling system with a water pump. If the source of cold water is accessible on the surface, additional cooling can be applied.

The electric transformer is not illustrated in the drawings. It can be added on top of the unit or can be separated from the assembly and carried with a separate cable to reduce the weight of the assembly. If needed, several transformers can be added and spaced at necessary distance (levels). Within the transformer, the voltage is increased before the power is sent to the surface and power lines to carry electricity to homes and businesses.

It should be understood that the geothermal generator includes a safety relief valve on the boiler in case of failure of one or more valves. For simplicity, such a safety relief valve is not illustrated in the drawings.

One objective of this invention is to provide relatively cheap and clean electric energy continuously produced from geothermal renewable source—not limited to the "shallow" hydrothermal reservoirs. Besides common uses in homes and businesses, it can be used for production of hydrogen which can be used as a clean source of energy in many applications including the auto industry and eventually replace depleting, expensive and polluting oil, coal and other fossil fuels which are used to produce electricity. Nuclear power plants with very toxic waste material can also be replaced.

Another objective of this invention is to provide a self contained in-ground geothermal generator.

A further objective of this invention is to provide a geothermal generator assembled in the vertical position, containing a boiler with water, turbines, an electric generator, and a condenser with a system of insulated pipes for returning water back to the boiler.

A still further objective of this invention is to provide a gear box (converter) located between the turbines and the generator to neutralize momentum produced by spinning turbines by changing the direction of the rotor of the generator to spin in the opposite direction of the main turbines.

A further objective of this invention is to provide slim cylindrical design and simplicity of invention.

Another objective of this invention is to provide structural external and structural internal cylinders with a cooling chamber between them which surrounds main compartments and extends downward with the external cylinder forming the bottom part of the boiler.

A still further objective of this invention is to provide multiple levels of steam pressurization with a multiple boiler system.

A further objective of this invention is that the external structural cylinder of the boiler has external and internal indentations to increase the conductive surface area and to increase conductivity of heat to the water inside the boiler.

It is also an objective of this invention that geothermal energy becomes controllable and production of relatively cheap electric energy becomes available by lowering the unit with a cable into a pre-drilled well to the desired level and temperature.

A further objective of this invention is that electricity is produced by a generator at the in-ground unit and transported to the surface by electric cable.

Another objective of this invention is that a heat exchange will occur by use of water circulations.

The foregoing and other features and advantages of the present invention will be apparent from the following more detailed description of the particular embodiments of the invention, as illustrated in the accompanying drawings.

BRIEF DESCRIPTION OF THE DRAWINGS

The invention will be described with reference to the figures of which.

DETAILED DESCRIPTION OF THE INVENTION

Figure 1:
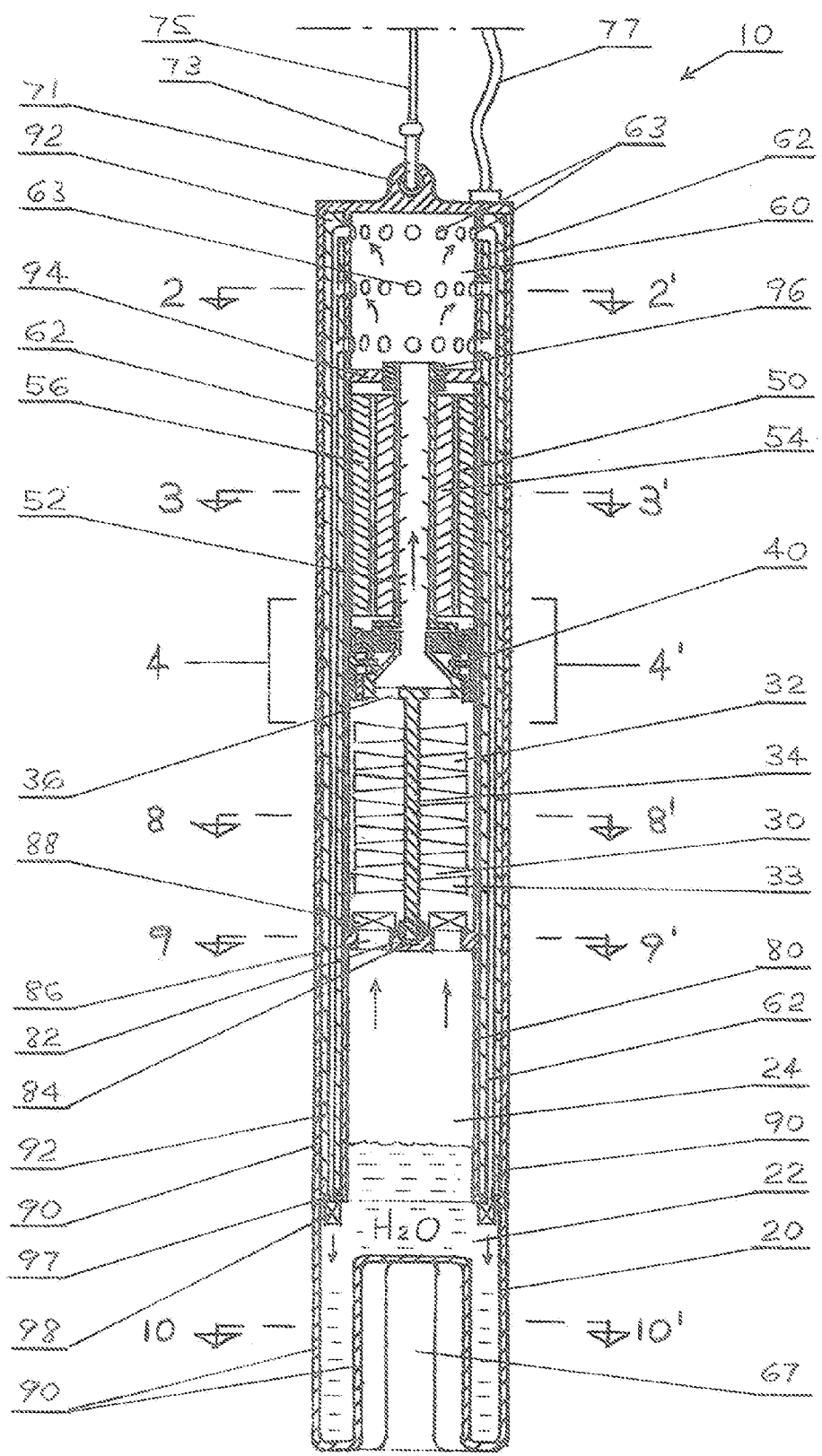
FIG. 1 is a cross sectional view taken along line 1-1' of FIG. 2 of a self contained in-ground geothermal generator, in accordance with the invention.
Figure 2:
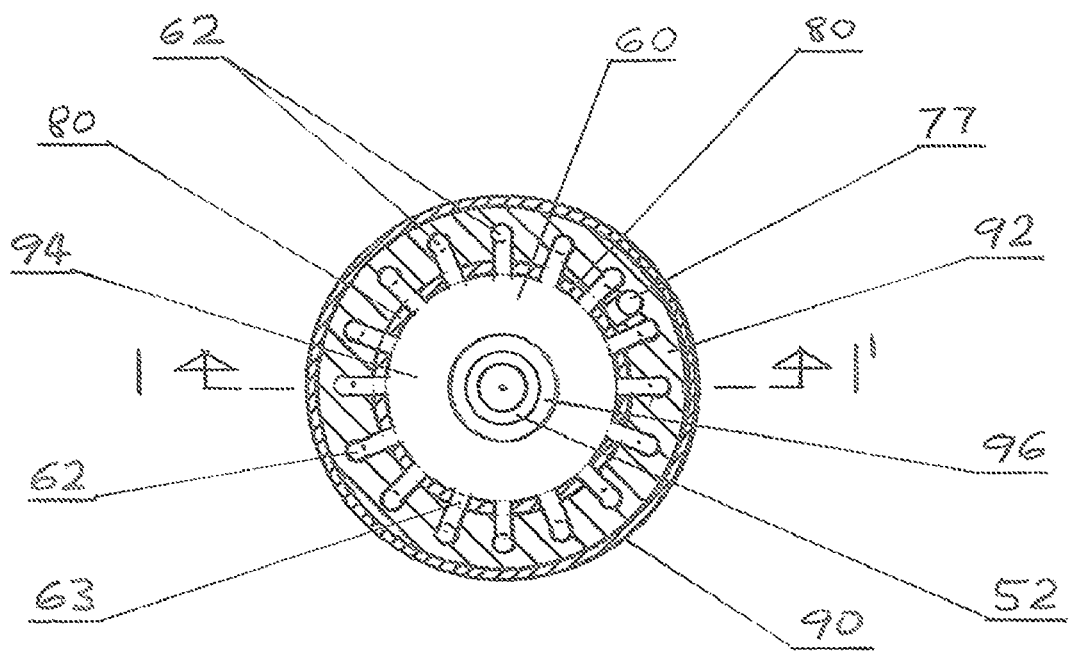
FIG. 2 is a cross sectional view of the condenser along line 2-2' of FIG. 1, in accordance with the invention.

Referring now to FIG. 1, the self contained in-ground geothermal generator 10 of the invention is shown in cross sectional view along line 1-1' of FIG. 2. The main elements of the assembly 10 are: the boiler 20, the turbine compartment 30, the gear box, or converter 40, the electric generator 50, and the condenser/distributor 60 with a system of tubes 62. The boiler 20 includes a water tank 22 and a steam compartment 24. The assembly 10 has a hook eye 71 and can be attached by hook 73 and cable 75 or with system of pulleys and cable and then lowered into pre drilled well deep in the ground to the level where rock heated by magma deep below the surface boils the water in the boiler 20. High-pressure superheated steam passes through a set of turbines 33, which has a set of blades 32 which are attached to a solid shaft 34 and spins it. The solid shaft 34 of the turbines 33 is connected to a cylindrical shaft 52 of the electric generator 50 through a gear box or converter 40. Steam from the turbine compartment is stirred through a set of openings 36 and through the cylindrical shaft 52 of the generator 50 into the condenser/distributor 60. Exhausted steam then starts condensing and is stirred through the set of openings 63 into a plurality of insulated tubes 62 and back into the boiler 20.

Here is also illustrated a structural external cylinder 90 and structural internal cylinder 80 enclosing a space between them with a ring shaped disk 97 and extending downward with the external cylinder 90 forming the bottom part of the boiler with external indentations 65 and internal indentations 67. Here is also illustrated a set of one way check vales 98 which are attached to the ends of the tubes 62 and accommodated at corresponding openings at the ring shaped disk 97.

It will be understood that while particular embodiments of the present invention show the use of water within the boiler 20, other embodiments of the present invention may utilize liquids that have lower temperature boiling points, thereby requiring less heat in order to accomplish the phase change from liquid to gas needed for the geo-thermal generator 10 to operate.

Referring now to FIGS. 4-7, the upper end of the turbine shaft 34 is solidly connected with disk 35 which extends to the peripheral cylinder 41 of the gear box 40, with which is secured and engage with system of bearings 42 and gears wheels 43. The gear box is secured to the main structural cylinder 80. The disk 35 has several openings 36 for steam to leave the turbine compartment. It also extends upwardly in the shape of a funnel for steam to be funneled into cylindrical shaft 52 of the electric generator 50. The cylindrical shaft 52 of the rotor 54 also functions as a secondary turbine. It has a secondary set of small blades 58 attached to the inside wall and positioned to increase rotation of the rotor when steam passes through.

Disk 35 is engaged with upper disc 37 through a set of gear wheels 43 which are secured with the peripheral cylinder 41 of the gear box 40 with their axles 44. Upper disk 37 is also engaged with the upper part 38 of the funnel 39 through bearing 46 and with the peripheral cylinder 41 of the gear box 40 through bearing 47 and is also solidly connected to the cylindrical shaft 52 of the generator 50. Disk 35 and disk 37 have carved grooves 45 which engage and correspond with gear wheels 43.

The purpose of the gear box 40, which is located between the turbines 33 and the generator 50, is to neutralize momentum produced by the spinning turbines 33 by changing the direction of the rotor 54 of the generator 50 to spin in the opposite direction to the main turbines 33.

FIG. 2 is a cross sectional view of the condenser/distributor 60 along line 2-2' of FIG. 1. FIG. 2 illustrates the main structural internal cylinder 80, the external structural cylinder 90, and insulation 92 between these two cylinders, which surround the tubes 62. Exhausted steam passes through openings 63, which lead to tubes 62, which then return the condensed water to the boiler 20. At the end of the tubes 62, there are sets of one way check valves 98. Here is also shown solid disk 94 which separates the generator 50 from the condenser/distributor 60. The upper end of the cylindrical shaft 52 is secured and engaged to the disk 94 through a bearing 96. Here is also shown electrical conduit 77 which transports electricity from the generator 10 to the surface and further to the power lines.

Figure 3:
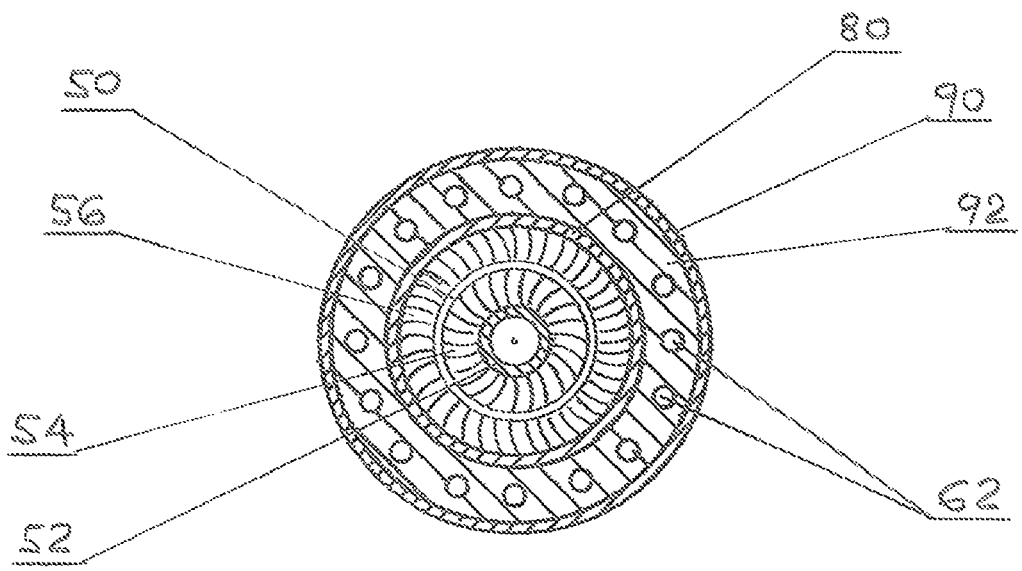
FIG. 3 is a cross sectional view of the generator along line 3-3' of FIG. 1, in accordance with the invention.
Figure 4:
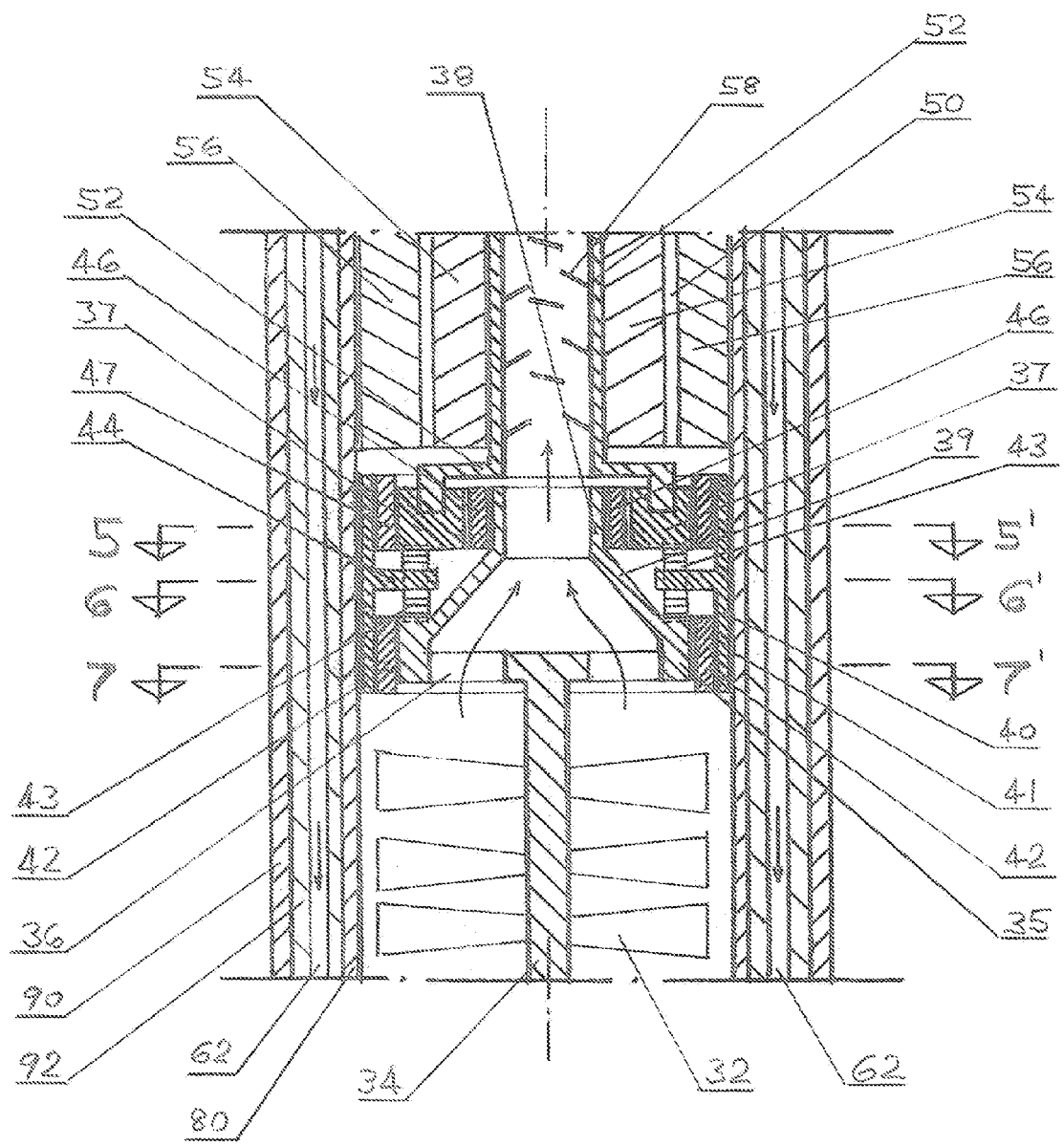
FIG. 4 is an enlarged cross sectional view along line 4-4' of FIG. 1 illustrating the gear box, in accordance with the invention.
Figure 5:
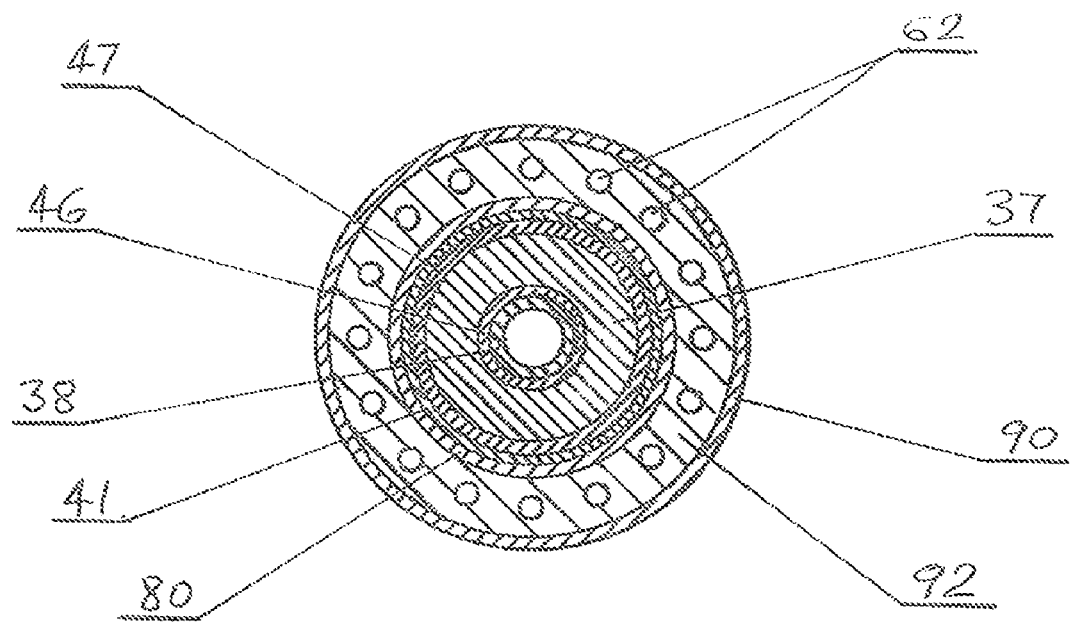
FIG. 5 is a cross sectional view along line 5-5' of FIG. 4, in accordance with the invention.
Figure 6:
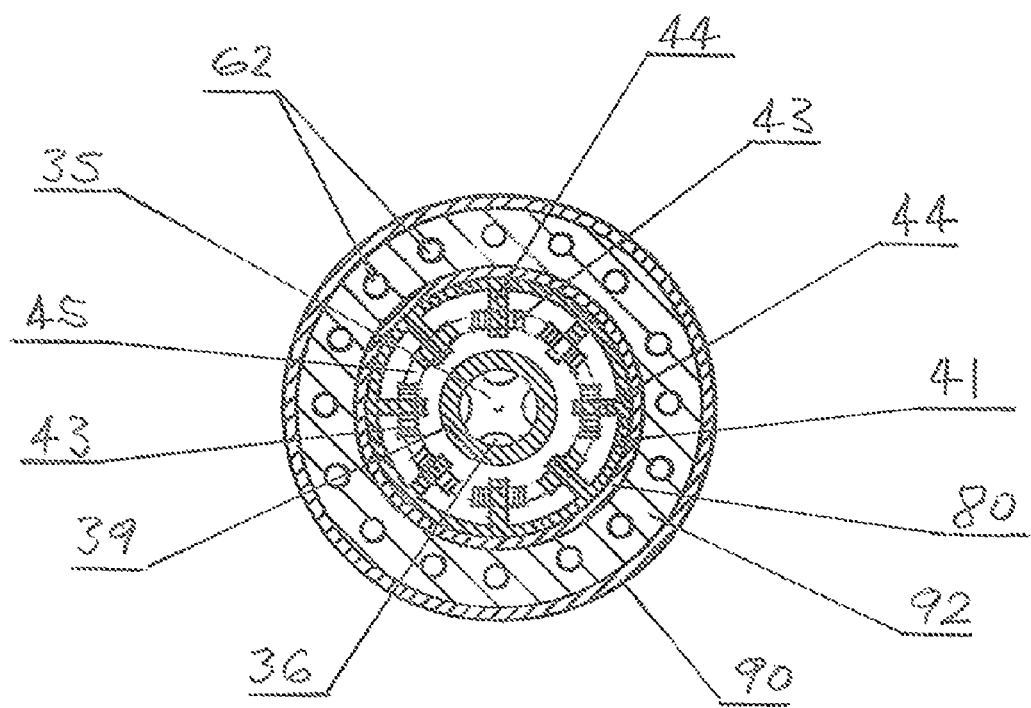
FIG. 6 is a cross sectional view along line 6-6' of FIG. 4, in accordance with the invention.
Figure 7:
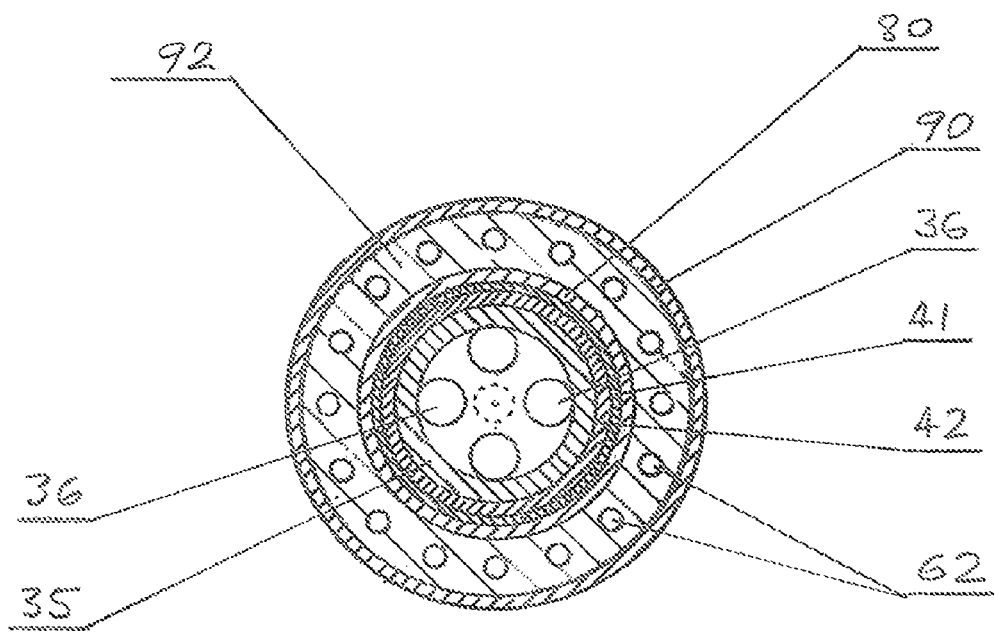
FIG. 7 is a cross sectional view along line 7-7' of FIG. 4, in accordance with the invention.

FIG. 3 is a cross sectional view of the generator 50 along line 3-3' of FIG. 1. FIG. 3 illustrates the main structural internal cylinder 80, the external structural cylinder 90 and insulation 92 between these two cylinders, which surround the tubes 62. Here is also illustrated cylindrical shaft 52, rotor 54 which is fixed to the shaft 52 and stator 56 which is fixed to the main internal structural cylinder 80.

Figure 8:
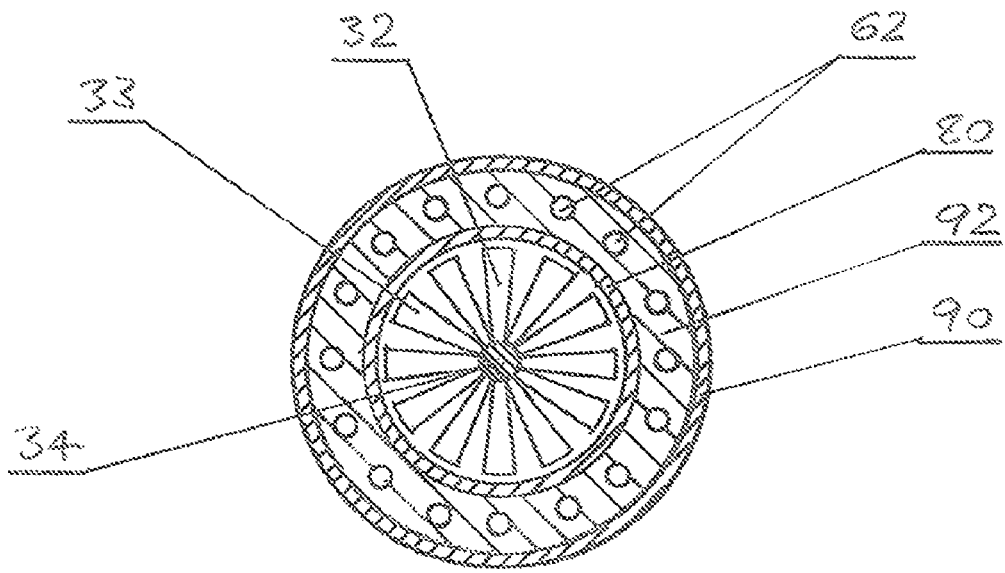
FIG. 8 is a cross sectional view of the turbines along line 8-8' of FIG. 1, in accordance with the invention.

FIG. 8 is a cross sectional view of the turbines 30 along line 8-8' of FIG. 1. FIG. 8 shows main structural internal cylinder 80, external structural cylinder 90 and insulation 92 between these two cylinders, which surround the tubes 62. Here is also illustrated solid shaft 34 and blades 32 of the turbines 33.

Figure 9:
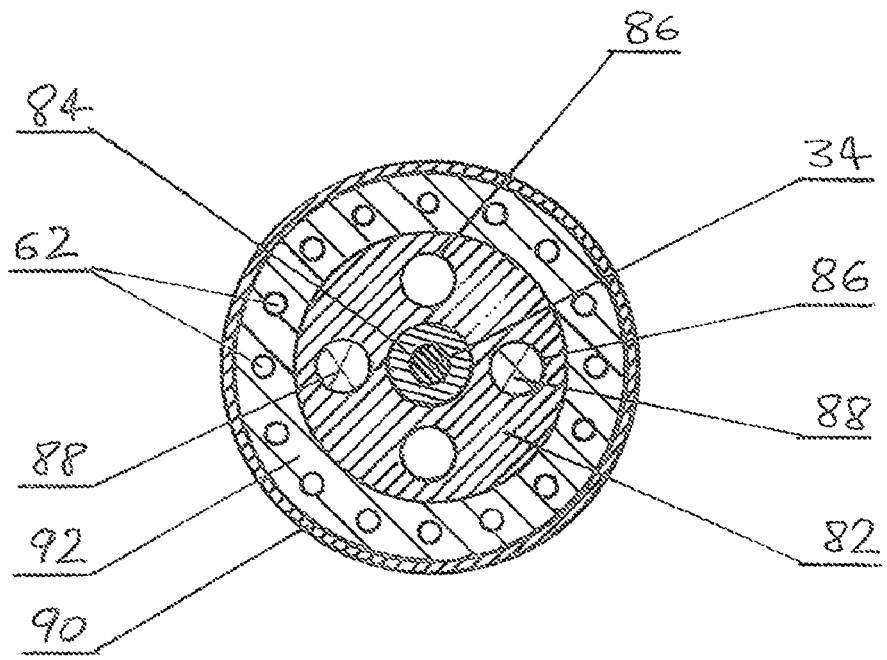
FIG. 9 is a cross sectional view along line 9-9' of FIG. 1, in accordance with the invention.

FIG. 9 is a cross sectional view along line 9-9' of FIG. 1. FIG. 9 illustrates the lower end of the shaft 34, which is secured and stands on the center of the platform disk 82 and is engaged with a set of bearings 84. Disk 82 is solidly connected to main structural internal cylinder 80 and has a set of openings 86, which accommodates a set of check valves 88, which can be activated automatically by pressure or electronically with sensors and a computer.

Figure 10:
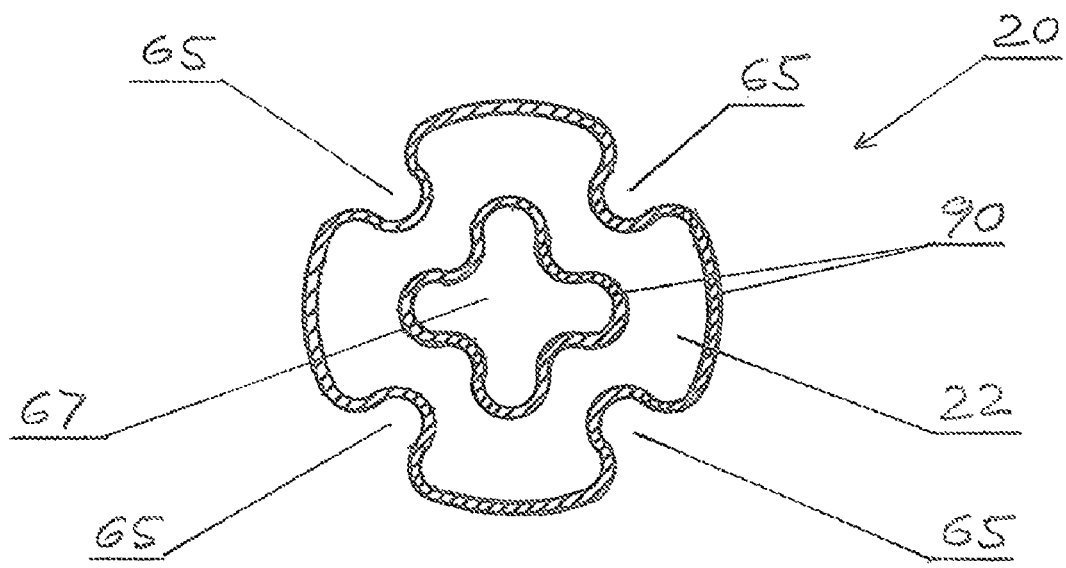
FIG. 10 is a cross sectional view of the boiler along line 10-10' of FIG. 1, in accordance with the invention.

FIG. 10 is a cross sectional view of the boiler 20 along line 10-10' of FIG. 1. FIG. 10 illustrates main structural external cylinder 90 with peripheral indentations 65 and internal indentations 67, or protrusions, which increase the conductive surface of the boiler and increase the conductivity of heat to the water inside the boiler 20.

Figure 11:
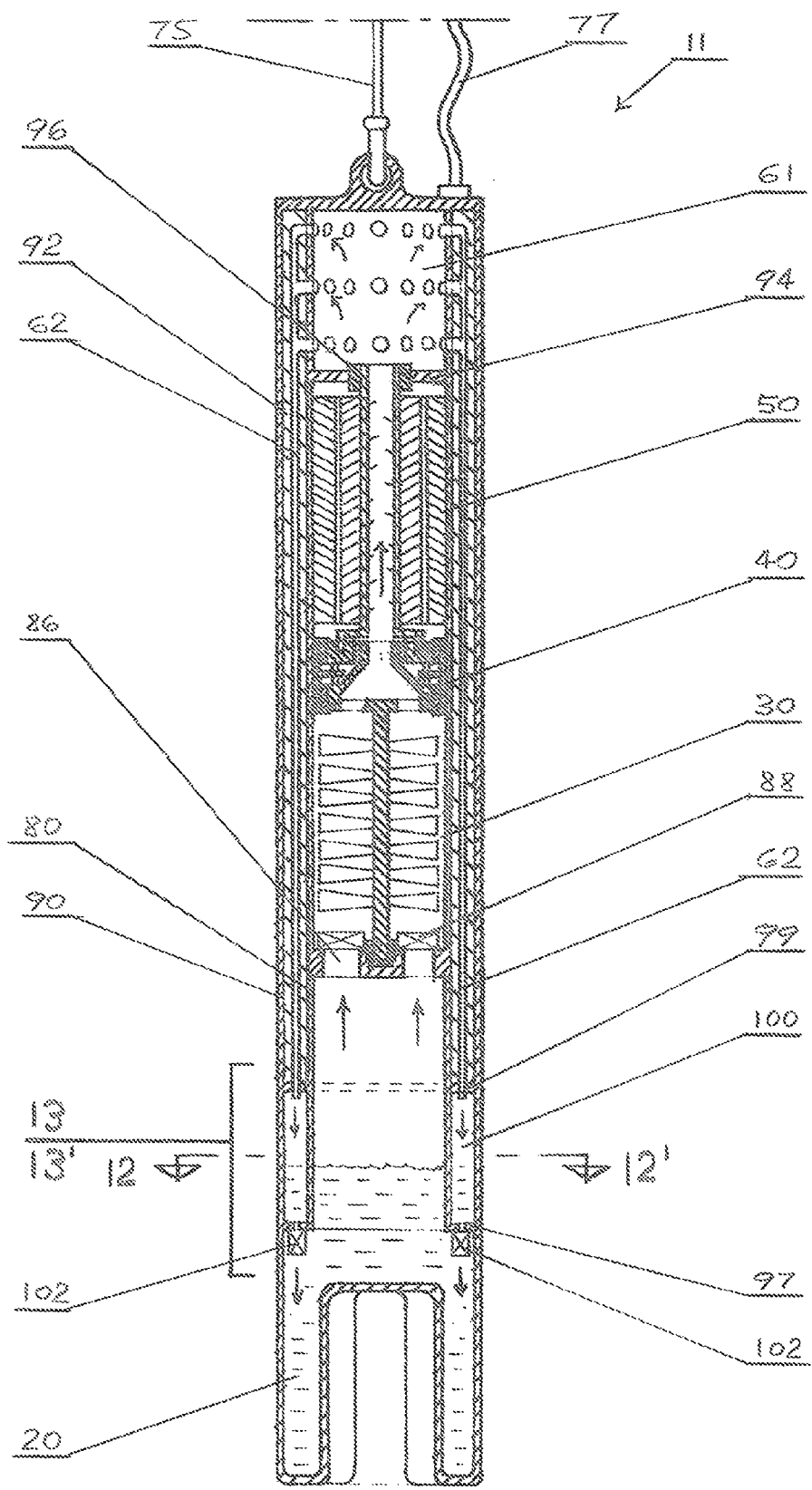
FIG. 11 is a cross sectional view taken along line 11-11' of FIG. 12 of another embodiment of a self contained in-ground geothermal generator, in accordance with the invention.
Figure 12:
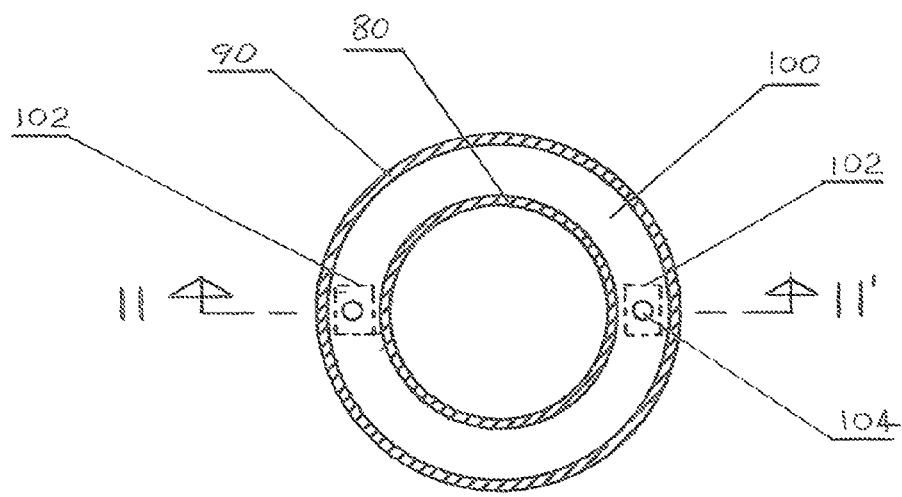
FIG. 12 is a cross sectional view of the collector along line 12-12' of FIG. 11, in accordance with the invention.

FIG. 11 is a cross sectional view of another embodiment of a self contained in-ground geothermal generator 11 with its basic elements, along line 11-11' of FIG. 12. Assembly 11 contains substantially the same elements as assembly 10 depicted in FIGS. 1-10, with the addition of a collector 100. The collector 100 is part of the condenser/distributor 60 and is formed between inner structural cylinder 80 and outer structural cylinder 90 and between ring shaped disks 97 and 99. It collects the condensed water from the tubes 62 before it is pumped into boiler 20 through water pumps 102.

FIG. 12 is a cross sectional view of the collector 100 along line 12-12' of FIG. 11. FIG. 12 illustrates inner structural cylinder 80 and outer structural cylinder 90 and water pumps 102.

Figure 13:
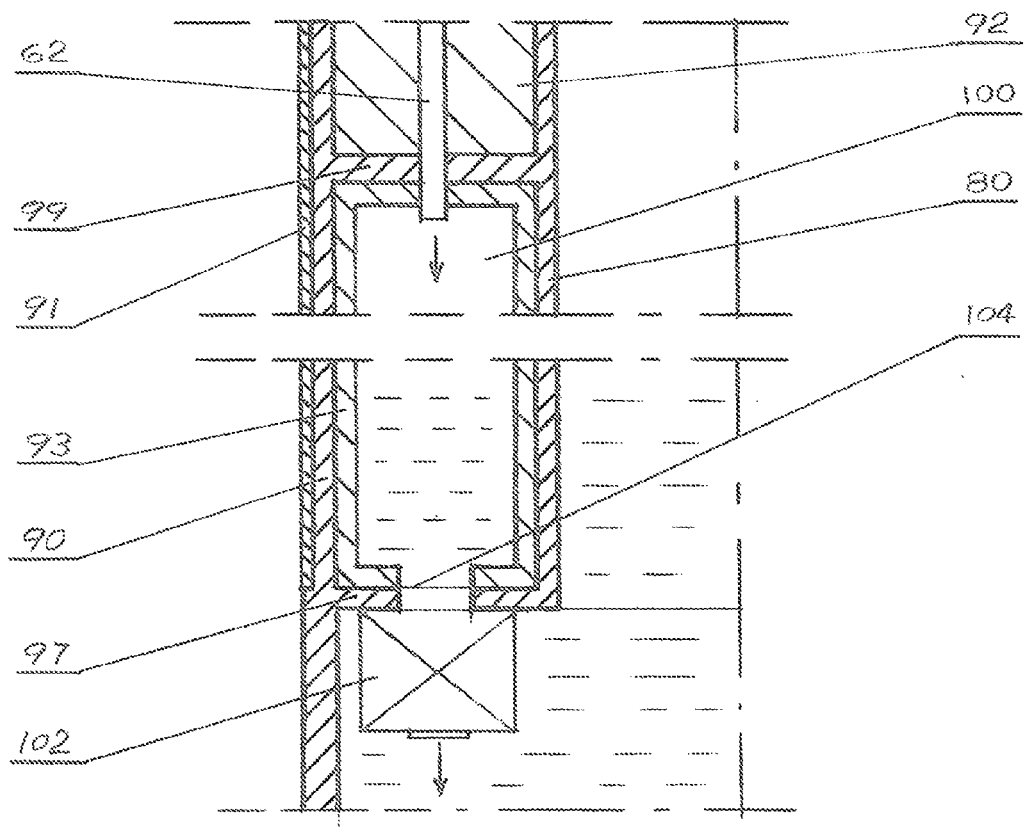
FIG. 13 is an enlarged cross sectional view along line 13-13' of FIG. 11 illustrating the collector, in accordance with the invention.

FIG. 13 is an enlarged cross sectional view along line 13-13' of FIG. 11 illustrating the collector 100. FIG. 13 illustrates inner structural cylinder 80 and outer structural cylinder 90 and water pumps 102. FIG. 13 also illustrates layers of insulated materials. Heat reflected foil 91 such as aluminum or the like reduces heat convention through areas other than the boiler. There is also heat resistant insulator 93 inside the collector 100. There are also ring shaped platform disks 97 and 99 which form top and bottom surfaces of the collector 100. Here is also illustrated opening 104 which corresponds with water pump 102 which pumps water back into the boiler to be reheated and used again.

Figure 14:
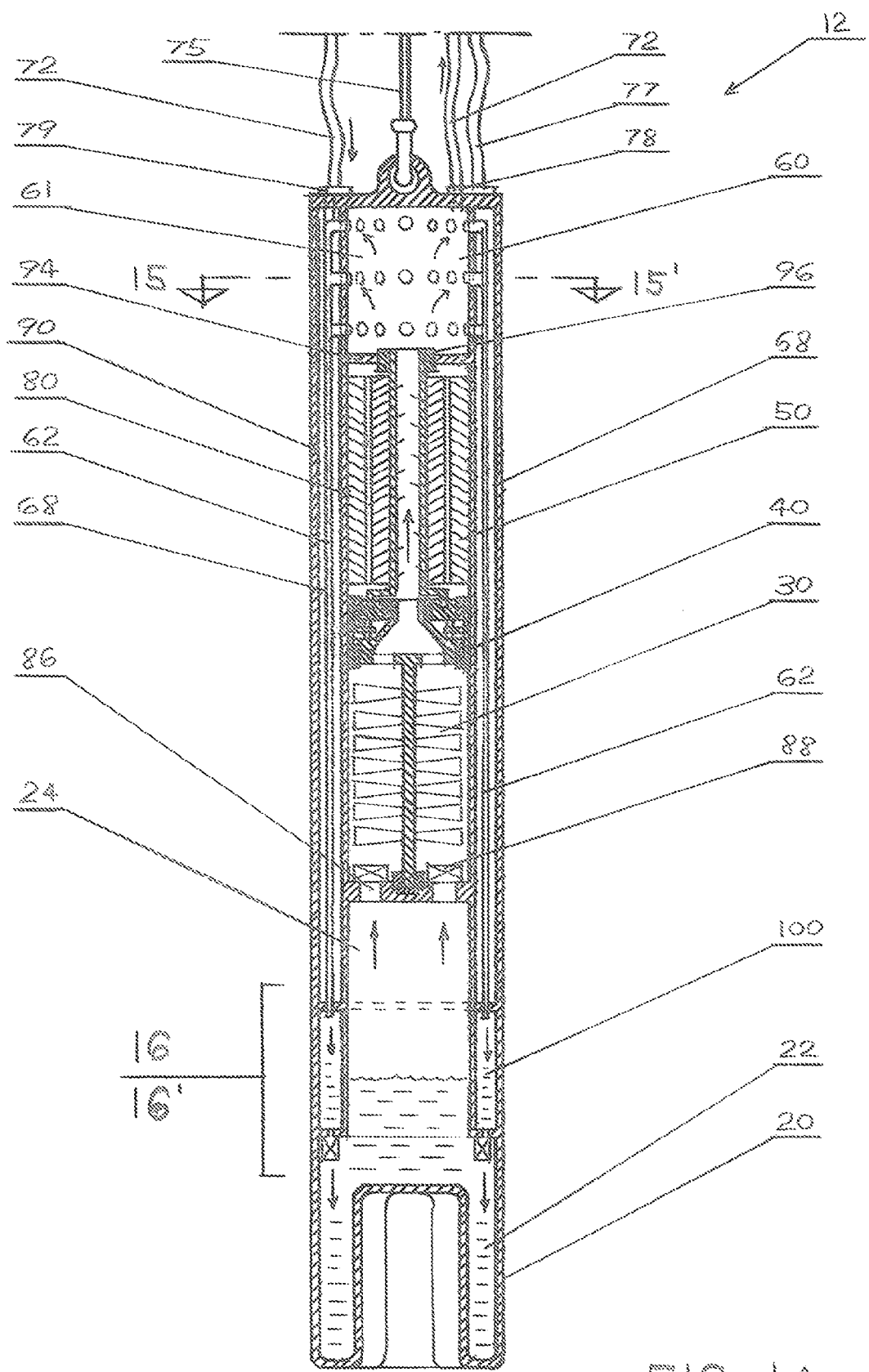
FIG. 14 is a cross sectional view taken along line 14-14' of FIG. 15 of still another embodiment of a self contained in-ground geothermal generator, in accordance with the invention.
Figure 15:
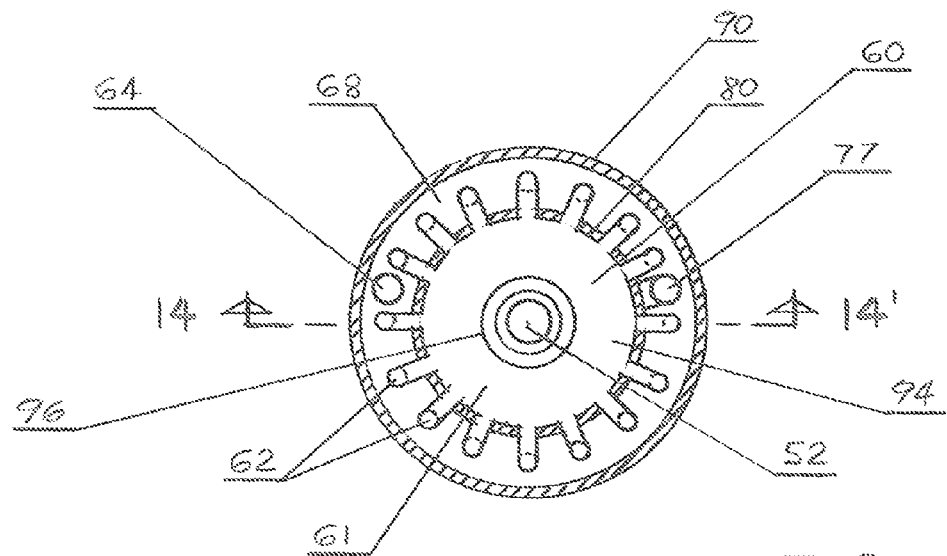
FIG. 15 is a cross sectional view of the condenser along line 15-15' of FIG. 14, in accordance with the invention.

FIG. 14 is a cross sectional view of another embodiment of a self contained in-ground geothermal generator 12 with its basic elements, along line 14-14' of FIG. 15. Assembly 12 contains substantially the same major elements as assemblies 10 and 11 depicted in FIGS. 1-13, with the addition of having a cooling compartment and heat exchanging up on the surface. Here is illustrated a condenser 60 that consists of distributor compartment 61, cooling compartment 68 and tubes 62. Cooling compartment 68 of the condenser 60 is formed between internal structural cylinder 80 and external structural cylinder 90 and surrounds turbine compartment 30, gear box compartment 40, generator compartment 50 and condenser distributor compartment 61. Cooling compartment 68 is filled with water which circulates to the surface and back through a closed loop hose (pipe) 72 to exchange heat and to cool tubes 62 in which exhausted steam is condensed and returned as liquid into boiler 20. Warm water leaves cooling compartment 68 through outlet connector 78 to which one end of the hose 72 is connected and travels though it up to the surface where heat is exchanged and cool water returns to the cooling compartment 68 through inlet connector 79 to which the other end of the hose 72 is connected. In this line, at the surface, the heat can be used for external uses such as installing a radiator to the system. Alternatively, this radiator can be submerged into a pool of water, or a set of pools, for heat exchange which then can have external uses such as in cold climates for heating houses or some other applications where warm water is needed. When using a set of pools, each pool may have a different temperature allowing the exchange of heat within each pool and the ability to use the exchanged heat for other purposes, wherein varying levels of heat are required. Also, in this line, one or more water pumps can be installed to increase circulation. Also in this line, a different coolant with a higher boiling point than water can be used instead of water.

FIG. 15 is a cross sectional view of the condenser 60 along line 15-15' of FIG. 14. FIG. 15 illustrates condenser 60, distribution compartment 61, cooler 68, tubes 62, cylindrical shaft 52, internal structural cylinder 80 and external structural cylinder 90.

Figure 16:
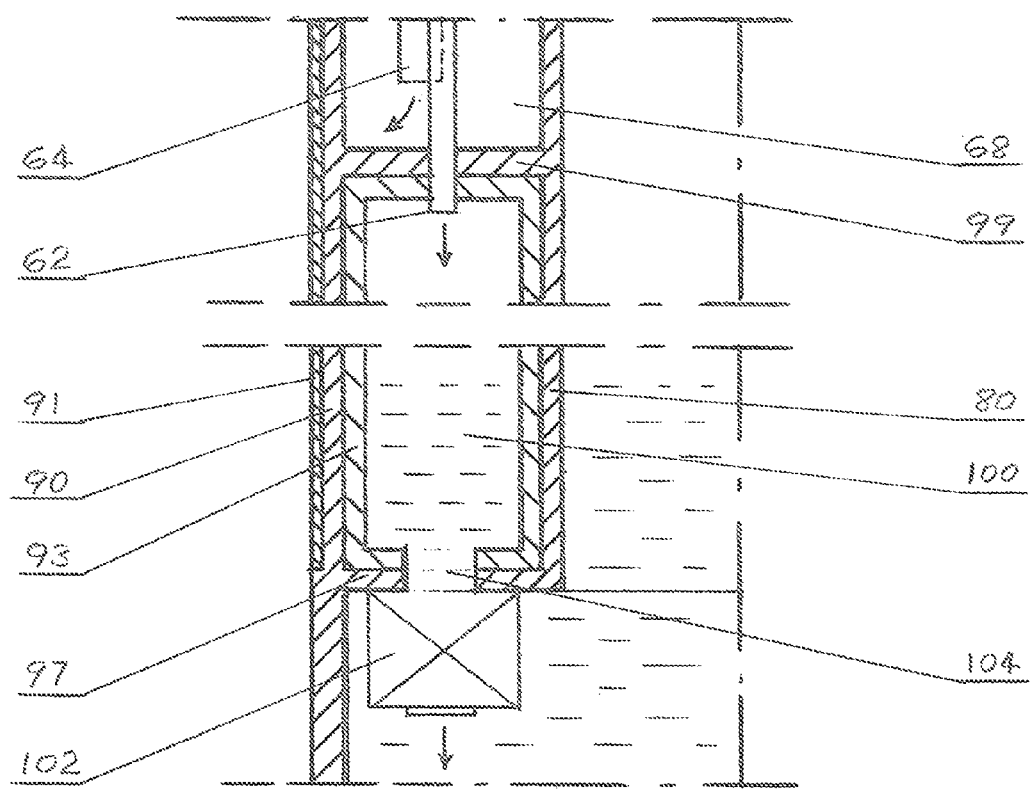
FIG. 16 is an enlarged cross sectional view along line 16-16' of FIG. 14 illustrating the collector, in accordance with the invention.

FIG. 16 is an enlarged cross sectional view along line 16-16' of FIG. 14 illustrating collector 100. FIG. 16 illustrates inner structural cylinder 80 and outer structural cylinder 90 and water pumps 102. Also illustrated are layers of insulated materials. Heat reflected foil 91 such as aluminum or the like reduces heat convection through areas other than the boiler. There is also heat resistant insulator 93 inside collector 100. There are also ring shaped disks 97 and 99 which form the top and bottom surfaces of the collector 100. Here is also illustrated opening 104 which corresponds with water pump 102 which pumps water back into the boiler to be reheated and used again. Here are also illustrated tubes 62 in which exhausted steam is condensed and delivered to collector 100 before returning to boiler 20 through water pump 102. Here is also illustrated tube 64 which is connected to inlet connector 79 and delivers cool water to the bottom of the cooler 68.

Figure 17:
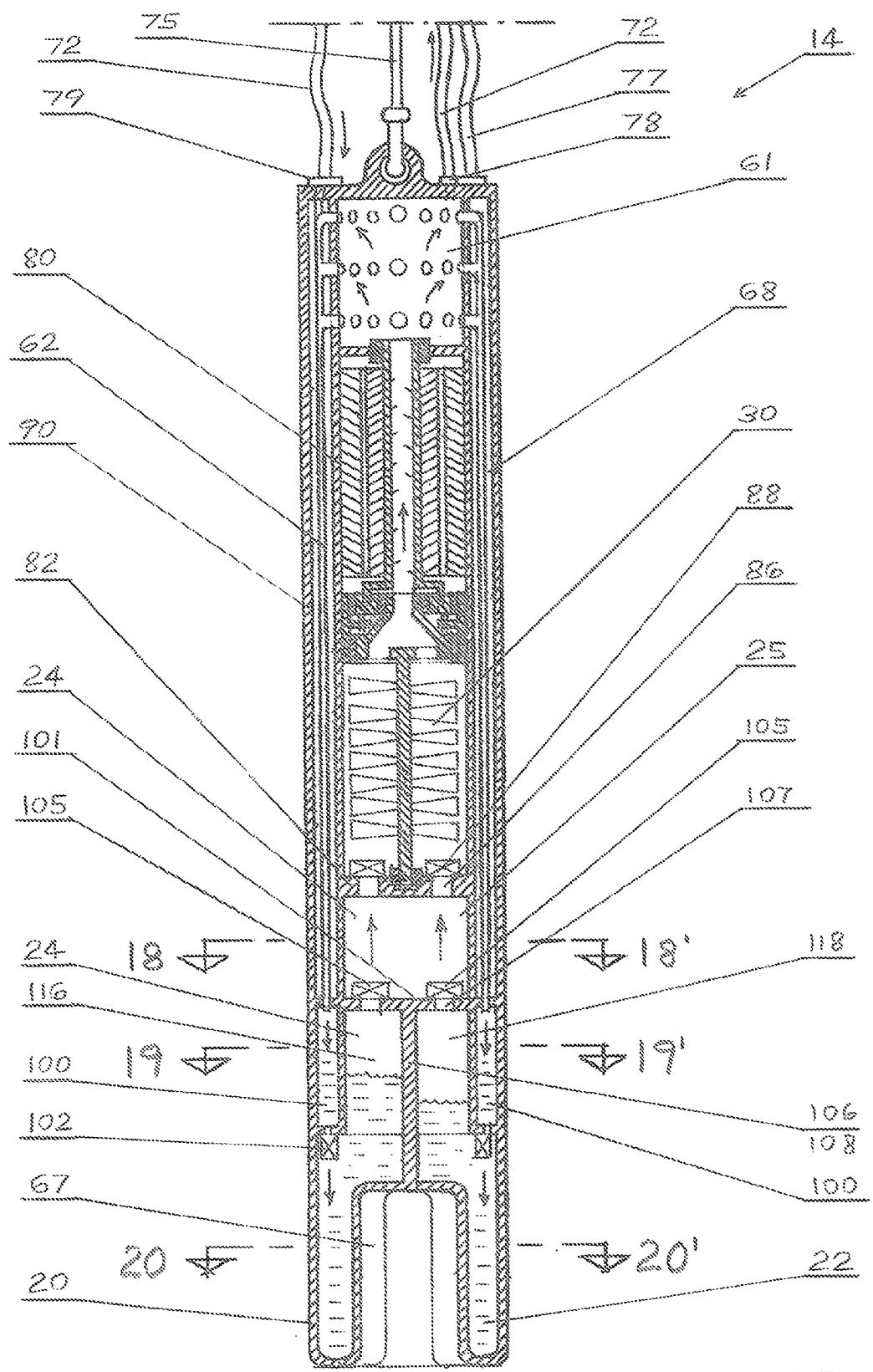
FIG. 17 is a cross sectional view taken along line 17-17' of FIG. 18 of still another embodiment of a self contained in-ground geothermal generator, in accordance with the invention.
Figure 18:
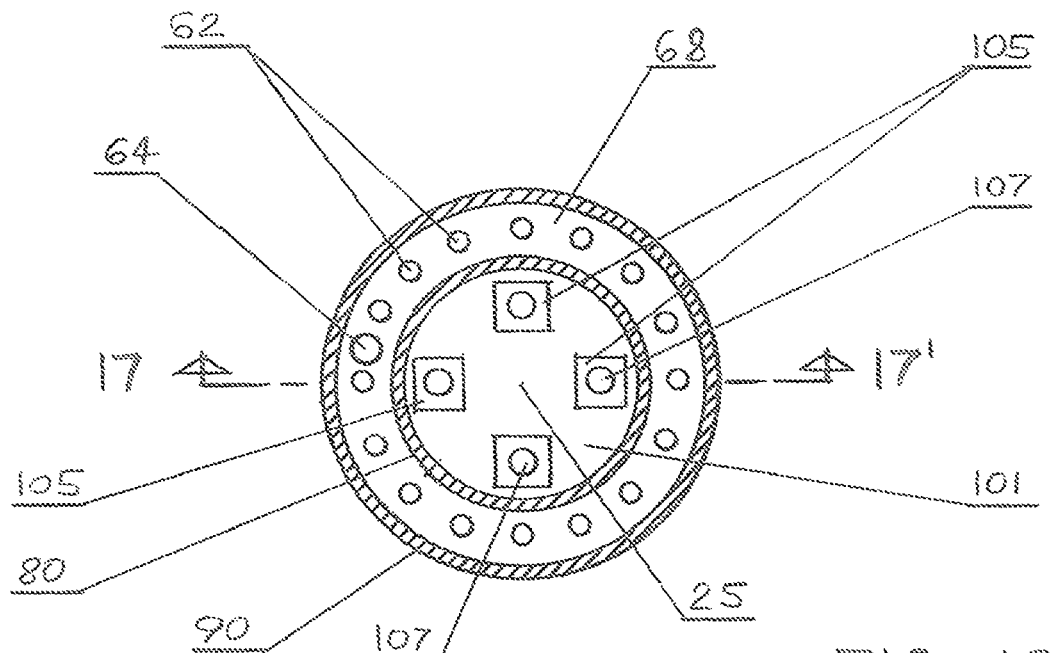
FIG. 18 is a cross sectional view of the high pressure chamber and condenser along line 18-18' of FIG. 17, in accordance with the invention.

FIG. 17 is a cross sectional view of another embodiment of a self contained in-ground geothermal generator 14 with its basic elements, along line 17-17' of FIG. 18. Assembly 14 contains substantially the same major elements as assemblies 10, 11 and 12 depicted in FIGS. 1-16 with the addition of having boiler 20 divided into several chambers, providing multiple levels of steam pressurization with multiple boiler chambers.

FIG. 18 is a cross sectional view of the high pressure chamber 25 and cooler 68 along line 18-18' of FIG. 17.

Figure 19:
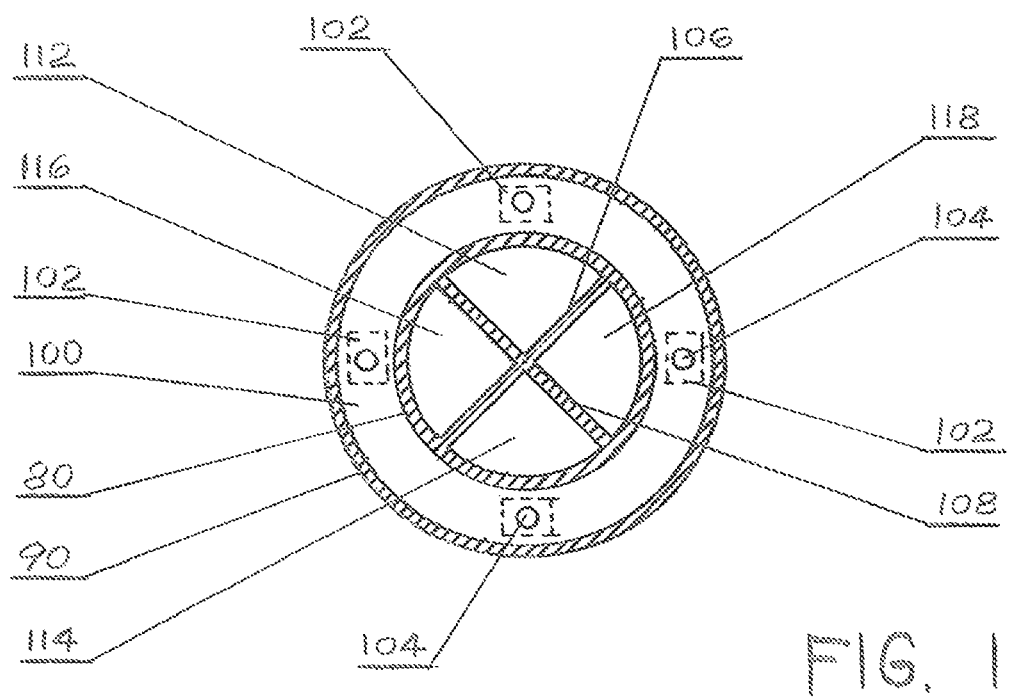
FIG. 19 is a cross sectional view of the four independent chambers of the boiler and collector along line 19-19' of FIG. 17, in accordance with the invention.

FIG. 19 is a cross sectional view of the four independent chambers of the boiler 20 and collector 100 along line 19-19' of FIG. 17.

Figure 20:
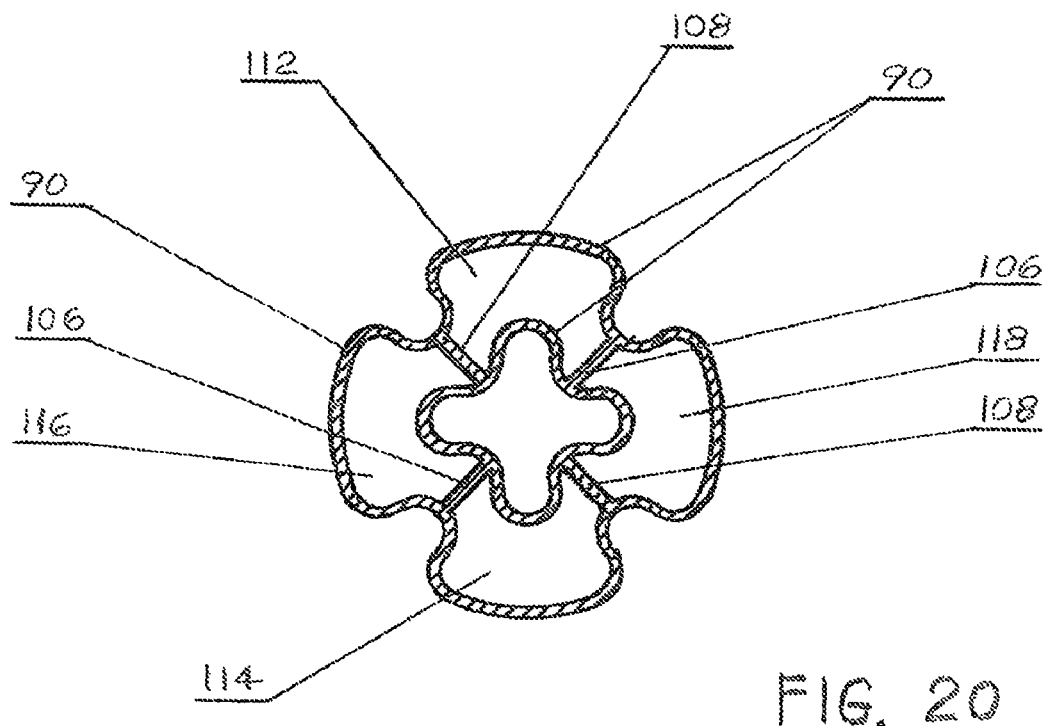
FIG. 20 is a cross sectional view of the boiler along line 20-20' of FIG. 17, in accordance with the invention.

FIG. 20 is a cross sectional view of the boiler along line 20-20' of FIG. 17.

Referring now to FIGS. 17-20, there are illustrated upper part 24 of boiler 20 divided with disc 101 forming high pressure chamber 25. Remaining chamber 24 is farther divided with two vertical walls 106 and 108, forming four independent chambers, or protrusions, 112, 114, 116 and 118 which communicate with upper chamber 25 through pumps 105 located on platform disk 101 and aligned with openings 107. High pressured steam from chamber 25 is released into turbine chamber 30 through a set of automatic check valves 88 which are located on platform disk 82 and aligned with openings 86. Chamber 25 is refilled and pressurized with steam from the four independent chambers 112, 114, 116 and 118 through pumps 105, which correspond with openings 107 located on platform disk 101. This process is cyclical, providing high pressure steam in chamber 25 almost continuously. An alternative option is to divide chamber 25 by providing only one of the two walls 106 or 108 and providing two independent high pressure chambers which would then each be supplied by steam from two independent chambers.

Figure 21:
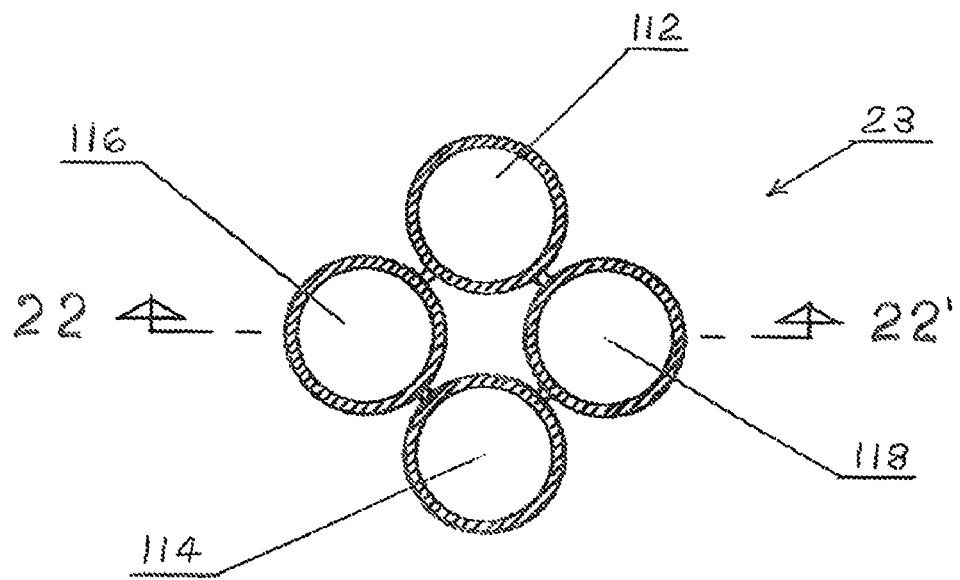
FIG. 21 is a cross sectional view of an alternative boiler along line 21-21' of FIG. 22, in accordance with the invention.
Figure 22:
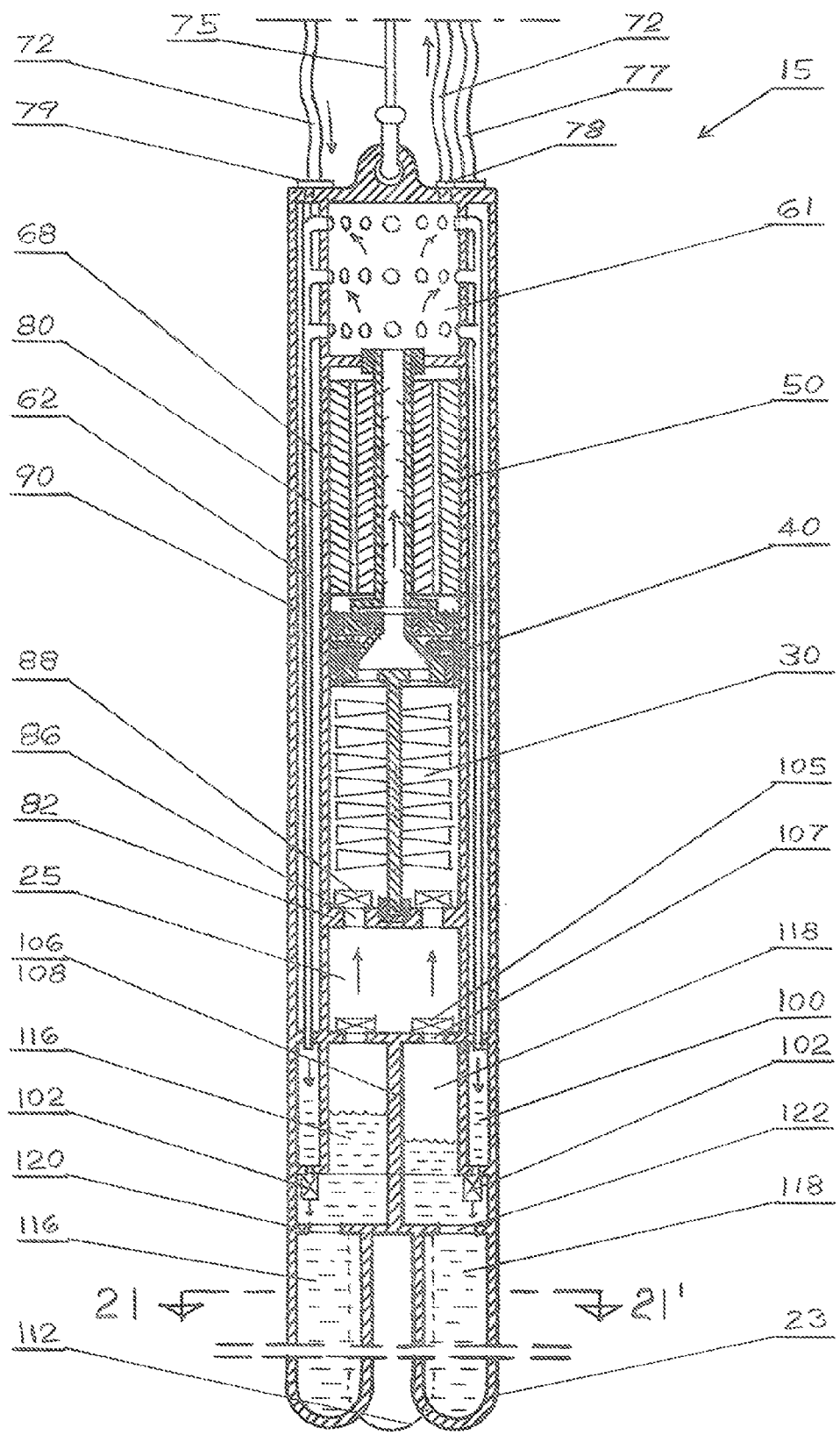
FIG. 22 is a cross sectional view taken along line 22-22' of FIG. 21 of still another embodiment of a self contained in-ground geothermal generator, in accordance with the invention.

FIG. 21 is a cross sectional view of an alternative shape of the lower part of the boiler 23 along line 21-21' of FIG. 22.

FIG. 22 is a cross sectional view of another embodiment of a self contained in-ground geothermal generator 15 with its basic elements, along line 22-22' of FIG. 21. Assembly 15 contains substantially the same elements as assemblies 10, 11, 12, and 14 depicted in FIGS. 1-20. Assembly 15 is almost identical to the assembly 14 illustrated and explained in FIGS. 17-20, with the exception of the shape of the lower part of the boiler 23. There are four cylinders, or protrusions, 112, 114, 116 and 118, attached to the platform base 120 which has corresponding openings 122. The importance of the shape of the lower part of the boiler is in increasing surface area to increase the conductivity of heat from hot rocks to the water inside the boiler, which produces high-pressure superheated steam, which turns the turbines.

This invention explains a method of how to use unlimited sources of geothermal energy which has not been used in this way today. This invention explains how to use internal heat of our planet and produce electricity deep down and transport it to the surface by cable. This invention explains self contained geothermal generator with its basic elements, their shape, form and interactions and their functions.

In this presentation, turbines, generator, pumps, check valves and safety relief valves are not illustrated in details but there are many reliable, heat resistant, automatic, fast action pumps and check valves, turbines and generators used in power plants, steam engines, marines industry, and the like that may be applicable in embodiments of the present invention. Further, according to particular embodiments of the present invention, the length of the chambers are not limited to the respective sizes as represented in the drawing figures of this disclosure, but rather they may be of any desired length.

The sizes of elements of this invention, such as the diameter, are limited to drilling technology at the time, diameter of the wells and practical weight of the assembly. Combination of well drilling technology and tunneling technology could provide larger diameter of the wells and more powerful self contained in-ground geothermal generator.

Additionally, particular embodiments of the present invention may use a cable, chain or other suitable means for lowering the geo-thermal generator into the hole drilled. Once in the hole, the cable or chain may be used to hang the geothermal generator at a desired depth. Further, the geo-thermal generator may be rested upon a bottom surface within the drilled hole to support the generator. This configuration is particularly useful in limiting constant tension on the cable or chain.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

What is claimed is:

1. A method of using a geo-thermal generator, comprising:
    lowering the geo-thermal generator from a ground surface down to a desired level, wherein the desired level is at a desired elevated temperature;
    producing steam from a volume of water contained within the generator;
    storing the steam until the steam reaches a predetermined pressure;
    flowing the steam from a turbine compartment, through a converter and a cylindrical shaft of an electric generator into a condenser distributor compartment;
    producing electric energy from the steam; and
    transporting the electric energy from the desired level to the ground surface.

2. The method of claim 1, further comprising flowing the steam from a boiler compartment of the geo-thermal generator to the turbine compartment of the geo-thermal generator.

3. The method of claim 2, further comprising thermally insulating all components of the geo-thermal generator except the boiler compartment.

4. The method of claim 1, wherein the step of transporting the electric energy further comprises coupling an electric cable to the geo-thermal generator, wherein the electric cable extends from the desired level to the ground surface.

5. The method of claim 2, further comprising condensing the steam and flowing the exhausted steam from a condenser distributor compartment of the geo-thermal generator through the condenser to the boiler compartment.

6. The method of claim 5, wherein the step of flowing the exhausted steam further comprises flowing the exhausted steam through a plurality of tubes, the tubes configured in a closed loop.

7. The method of claim 6, wherein the plurality of tubes are disposed within a condenser, a space between an internal cylinder and an external cylinder, the external cylinder defining the length of the geo-thermal generator and the external cylinder being longer than the internal cylinder for the length of the boiler.

8. The method of claim 7, further comprising circulating cooled water in and hot water out of the space between the internal cylinder and the external cylinder for cooling the geo-thermal generator.

9. The method of claim 1, wherein the step of producing electric energy further comprises using the steam to turn turbines.

10. The method of claim 1, further comprising exchanging heat at the ground surface by use of a closed loop pipe of the geo-thermal generator.

11. The method of claim 10, further comprising transferring heat for external uses.

12. A geo-thermal generator, comprising:
    a boiler compartment;
    a turbine compartment;
    a converter compartment;
    an electric generator compartment;
    a condenser distributor compartment;
    a condenser; and
    an electric cable,
    wherein the boiler compartment further comprises a steam chamber structured to store steam until the steam reaches a predetermined pressure to enter the turbine compartment, and the steam flows from the turbine compartment, through the converter compartment and a cylindrical shaft of the electric generator into the condenser distributor compartment.

13. The geo-thermal generator of claim 12, further comprising an internal cylinder and an external cylinder, wherein the external cylinder surrounds the boiler compartment, the turbine compartment, the converter compartment, the electric generator compartment, and the condenser distributor compartment and the internal cylinder surrounds the turbine compartment, the converter compartment, the electric generator compartment, and the condenser distributor compartment.

14. The geo-thermal generator of claim 13, further comprising a plurality of tubes disposed within the condenser, a space between the internal cylinder and the external cylinder.

15. The geothermal generator of claim 12, further comprising thermal insulation, the insulation surrounding all components of the geo-thermal generator except the boiler.

16. The geo-thermal generator of claim 12, further comprising water or isopentane contained within the boiler.

17. The geo-thermal generator of claim 14, wherein the plurality of tubes are coupled to a distributor compartment of the condenser at a first end and to the boiler at a second end.

18. The geo-thermal generator of claim 14, further comprising a collector disposed between the internal cylinder and the external cylinder wherein the plurality of tubes engage the collector.

19. The geo-thermal generator of claim 18, wherein the plurality of tubes are coupled to a distributor compartment of the condenser at a first end and to the collector at a second end.

20. The geo-thermal generator of claim 13, further comprising a cooling compartment disposed between the internal cylinder and the external cylinder.

21. The geo-thermal generator of claim 12, further comprising protruding portions extending from the boiler at a bottom end of the geo-thermal generator.

22. The geo-thermal generator of claim 12, wherein the converter compartment comprises a funnel for funneling steam and a gear box mechanically coupled between a turbine shaft of a turbine within the turbine compartment and a hollow cylindrical shaft of a rotor of an electric generator within the electric generator compartment, wherein the gear box rotates the electric generator in a direction opposite a rotation direction of the turbine such that momentum of the turbine is neutralized by momentum of the electric generator.

* * * * *